United States Patent
Hessler et al.

(10) Patent No.: US 10,230,512 B2
(45) Date of Patent: Mar. 12, 2019

(54) SYSTEMS AND METHODS FOR MAPPING DMRS CONFIGURATION TO PHASE NOISE TRACKING PILOT FOR IMPROVED RECEIVER PERFORMANCE

(71) Applicant: Telefonaktiebolaget LM Ericsson (publ), Stockholm (SE)

(72) Inventors: Martin Hessler, Linköping (SE); Robert Baldemair, Solna (SE); Lars Lindbom, Karlstad (SE); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 149 days.

(21) Appl. No.: 15/515,825

(22) PCT Filed: Feb. 8, 2017

(86) PCT No.: PCT/SE2017/050119
§ 371 (c)(1),
(2) Date: Mar. 30, 2017

(87) PCT Pub. No.: WO2017/138871
PCT Pub. Date: Aug. 17, 2017

(65) Prior Publication Data
US 2018/0331804 A1    Nov. 15, 2018

Related U.S. Application Data
(60) Provisional application No. 62/292,921, filed on Feb. 9, 2016.

(51) Int. Cl.
*H04L 5/00* (2006.01)
*H04L 27/26* (2006.01)
*H04L 25/02* (2006.01)

(52) U.S. Cl.
CPC ......... *H04L 5/0051* (2013.01); *H04L 5/0007* (2013.01); *H04L 25/0226* (2013.01);
(Continued)

(58) Field of Classification Search
CPC . H04L 5/0051; H04L 5/0007; H04L 25/0226; H04L 27/2613; H04L 27/266;
(Continued)

(56) References Cited

U.S. PATENT DOCUMENTS

| | | | |
|---|---|---|---|
| 2014/0247778 A1* | 9/2014 | Gomadam | H04L 5/0051 370/329 |
| 2015/0358132 A1 | 12/2015 | Wallen et al. | |
| 2017/0048086 A1* | 2/2017 | Subramanian | H04L 25/0236 |

FOREIGN PATENT DOCUMENTS

WO    WO 2016 000915    1/2016

OTHER PUBLICATIONS

PCT Notification of Transmittal of the International Search Report and the Written Opinion of the International Searching Authority, or the Declaration for International application No. PCT/SE2017/050119—dated Apr. 21, 2017.

* cited by examiner

*Primary Examiner* — Benjamin H Elliott, IV
(74) *Attorney, Agent, or Firm* — Baker Botts, LLP

(57) ABSTRACT

According to certain embodiments, a user equipment (810) is provided for use in a cellular network. The user equipment (810) may include a transceiver (910), a processor (920), and a memory (930). The user equipment (810) may be configured to acquire a Demodulation Reference Signal (DMRS) configuration. A mapping is determined from the DMRS configuration to a phase noise tracking reference signal (PNT-RS). A channel estimate is performed using the DMRS configuration. Phase noise estimation and compen- (Continued)

sation is performed based on the PNT-RS by using the mapping and the channel estimate.

18 Claims, 13 Drawing Sheets

(52) U.S. Cl.
CPC ........ *H04L 27/266* (2013.01); *H04L 27/2613* (2013.01); *H04L 27/2675* (2013.01)

(58) Field of Classification Search
CPC ............. H04L 27/2675; H04L 25/0236; H04L 5/0048; H04L 5/006
See application file for complete search history.

SYSTEMS AND METHODS FOR MAPPING DMRS CONFIGURATION TO PHASE NOISE TRACKING PILOT FOR IMPROVED RECEIVER PERFORMANCE

PRIORITY

This non-provisional application is a U.S. National Stage Filing under 35 U.S.C. § 371 of International Patent Application Serial No. PCT/SE2017/050119 filed Feb. 8, 2017, and entitled "Systems and Methods for Mapping DMRS Configuration to Phase Noise Tracking Pilot for Improved Receiver Performance" which claims priority to U.S. Provisional Application No. 62/292,921 filed on Feb. 9, 2016, both of which are incorporated herein by reference.

TECHNICAL FIELD

The present disclosure relates, in general, to wireless communications and, more particularly, to mapping DMRS configuration to phase noise tracking pilot for improved receiver performance.

BACKGROUND

Communications between a transmitter and receiver generally require some form of synchronization in time and/or frequency before transmissions of messages can be received reliably. In cellular systems such as Long Term Evolution (LTE), base stations regularly broadcast narrowband synchronization signals regularly in time from which wireless devices accessing the system can perform an initial cell search, i.e. going through a synchronization procedure that includes finding carrier frequency, time reference instants and cell identity. An LTE wireless device that has performed initial cell search and identified the cell identity can then complete the initial synchronization in downlink by making a fine synchronization on cell specific reference signals that are transmitted over the system bandwidth and more frequently in time than the synchronization signals. The wireless device connects to the network via a random access procedure in which uplink time synchronization will be established and communications between the device and the base station can begin. Due to oscillator drifting at both transmitter and receiver sides, the wireless device needs to regularly perform fine frequency synchronization in downlink during the communications with the base station.

A lean frame structure design for NX without cell specific reference signals (CRS) has been proposed where instead reference signals required for fine synchronization and demodulation of a downlink (DL) physical data channel (PDCH) are embedded into the PDCH transmission. FIG. 1 illustrates the DL transmissions of PDCH and associated DL physical downlink control channel (PDCCH), carrying an assignment or a grant. More specifically, FIG. 1 illustrates that the first Orthogonal Frequency Division Multiplexing (OFDM) symbol of a subframe contains PDCCH and following OFDM symbols contain PDCHs.

As also illustrated in FIG. 1, transmissions of PDCH may span over multiple subframes in the case of subframe aggregation or be confined to one subframe. A wireless device, which may also be referred to as user equipment (UE), detects PDCCH addressed to the UE and derives from the scheduling information PDCH related information. A UE is not aware of PDCCH transmissions to other UEs where a PDCCH to one particular user is carried on a subset of OFDM subcarriers. The mapping of PDCCH can either be distributed or localized with latter being illustrated in FIG. 1. The number of OFDM symbols within a subframe is a system design parameter and may very well be larger than the 4 used in the depicted example.

In the illustrated example, PDCCH and PDCH have their own reference signals for demodulation which mainly refer to Demodulation Reference Signals (DMRS) but could potentially also refer to other types of reference signals as will be discussed herein. The DMRS should be transmitted early in the subframe to enable the receiver to perform early channel estimation and by that reduce receiver processing time.

In the context of NX, time-synchronization is done using a first reference signal (e.g., a Time Synchronization Signal (TSS)) and coarse-frequency-sync using the same first reference signal or a second signal (e.g., Frequency Synchronization Signal). One may observe that these signals are not intended to provide a very accurate synchronization, neither in time nor in frequency. The time-error can be handled by the cyclic-prefix in an OFDM system and the frequency error by having sufficient sub-carrier spacing. However, in order to not limit the performance of higher rank transmissions of PDCH in conjunction with higher modulation (such as 64 and 256 QAM) schemes, better frequency-synchronization is needed. State of the art solutions (e.g. as in LTE) reuse DMRS or CRS for this purpose.

In 5G system deployments at higher carrier frequencies, the radio link will exhibit some new properties compared to LTE at lower carrier frequencies. One of the fundamental changes is that the phase noise problem is scaled with frequency which introduces a need for a new phase reference signal to mitigate phase noise that is common for all subcarriers within an OFDM symbol. This reference signal may be needed both in uplink and downlink. It is foreseen that this signal can be used for both fine carrier frequency-synchronization and phase noise compensation. Where the second is the focus, the reference signal may be referred to as the Phase Noise Tracking Reference Signal (PNT-RS).

FIG. 2 illustrates an example time-frequency grid containing DMRS and phase noise tracking RS. The illustrated design is just one example since the design has not yet been specified in 3GPP. As depicted, the reference signal is transmitted time continuously and a length 8 cover-code is assumed to be used to create 8 orthogonal DMRS resources. The DMRS resource can be enumerated 0 . . . 7 and can be considered to be 8 DMRS ports.

In a traditional synchronized radio system, such as, for example, LTE, some signals are always present to allow the UE to find the signals without having to communicate with the network first. Examples of such signals include Primary Synchronization Signal (PSS), Secondary Synchronization Signal (SSS), and CRS. These types of signals allow the UE to keep time-frequency sync with the network. However, the always-on signals add some complexity to the radio system, result in bad energy performance, and provide constant interference.

Some more recent solutions include a lean system design that removes said signals from the radio system. A problem with these designs is that the sync-procedure becomes more complicated and overhead increases. For example, phase noise tracking RSs may use a large fraction of the spectrum at the cost of decreased data rates. As another example, reusing DMRS is inefficient as the needed time-density is high for accurate phase noise tracking. The DMRS design takes frequency selectivity into account, implying that the resource density in frequency needs to be rather high for demodulation performance. Thus, if the same signal is used for both demodulation and phase noise tracking, unnecessary high overhead may be created.

SUMMARY

To address the foregoing problems with existing solutions, disclosed is methods and systems for Demodulation Reference Signal (DMRS) mapping to phase noise tracking pilot for improved receiver performance.

According to certain embodiments, a user equipment is provided for use in a cellular network. The user equipment may include a transceiver, a processor, and a memory. The user equipment may be configured to acquire a Demodulation Reference Signal (DMRS) configuration. A mapping is determined from the DMRS configuration to a phase noise tracking reference signal (PNT-RS). A channel estimate is performed using the DMRS configuration. Phase noise estimation and compensation is performed based on the PNT-RS by using the mapping and the channel estimate.

According to certain embodiments, a method by a user equipment is provided for use in a cellular network. The method includes acquiring a Demodulation Reference Signal (DMRS) configuration. A mapping is determined from the DMRS configuration to a phase noise tracking reference signal (PNT-RS). A channel estimate is performed using the DMRS configuration. Phase noise estimation and compensation is performed based on the PNT-RS by using the mapping and the channel estimate.

According to certain embodiments, a user equipment is provided for use in a cellular network. The user equipment includes a transceiver, a processor, and a memory. The user equipment is configured to send a Demodulation Reference Signal (DMRS) configuration. The DMRS configuration is associated with a mapping to a PNT-RS transmission. A PNT-RS is transmitted to the receiver according to the mapping.

According to certain embodiments, a method by a user equipment is provided for use in a cellular network. The method includes sending a Demodulation Reference Signal (DMRS) configuration. The DMRS configuration is associated with a mapping to a PNT-RS transmission. A PNT-RS is transmitted to the receiver according to the mapping.

According to certain embodiments, a network node is provided for use in a cellular network. The network node includes a transceiver, a processor, and a memory. The network node is configured to acquire a Demodulation Reference Signal (DMRS) configuration. A mapping is determined from the DMRS configuration to a phase noise tracking reference signal (PNT-RS). A channel estimate is performed using the DMRS configuration. Phase noise estimation and compensation is performed based on the PNT-RS by using the mapping and the channel estimate.

According to certain embodiments, a method by a network node is provided for use in a cellular network. The method includes acquiring a Demodulation Reference Signal (DMRS) configuration. A mapping is determined from the DMRS configuration to a phase noise tracking reference signal (PNT-RS). A channel estimate is performed using the DMRS configuration. Phase noise estimation and compensation is performed based on the PNT-RS by using the mapping and the channel estimate.

According to certain embodiments, a network node is provided for use in a cellular network. The network node includes a transceiver, a processor, and a memory. The network node is configured to send a Demodulation Reference Signal (DMRS) configuration. The DMRS configuration is associated with a mapping to a PNT-RS transmission. A PNT-RS is transmitted to the receiver according to the mapping.

According to certain embodiments, a method by a network node is provided for use in a cellular network. The method includes sending a Demodulation Reference Signal (DMRS) configuration. The DMRS configuration is associated with a mapping to a PNT-RS transmission. A PNT-RS is transmitted to the receiver according to the mapping.

According to certain embodiments, a method by a receiver is provided for use in a cellular network. The method includes acquiring a Demodulation Reference Signal (DMRS) configuration. A mapping to a PNT-RS transmission from the DMRS configuration is determined. A channel estimate is performed using the DMRS configuration. Phase noise estimation and compensation is performed based on the PNT-RS by using the mapping and the channel estimate.

According to certain embodiments, a receiver is provided for use in a cellular network. The receiver includes a transceiver, a transmitter, a processor, and a memory. The receiver is configured to acquire a Demodulation Reference Signal (DMRS) configuration and determine a mapping to a PNT-RS transmission from the DMRS configuration. A channel estimate is performed using the DMRS configuration. Phase noise estimation and compensation is performed based on the PNT-RS, using the mapping and the channel estimate.

According to certain embodiments, a method by a transmitter is provided. The method includes sending, by the transmitter, a Demodulation Reference Signal (DMRS) configuration. The DMRS configuration being associated with a mapping to a PNT-RS transmission. A PNT-RS is transmitted to the receiver according to the mapping.

According to certain embodiments, a transmitter is provided for use in a cellular network. The transmitter includes a transceiver, a transmitter, a processor, and a memory. The transmitter is configured to send a Demodulation Reference Signal (DMRS) configuration, the DMRS configuration being associated with a mapping to a PNT-RS transmission. A PNT-RS is transmitted to the receiver according to the mapping.

Certain embodiments of the present disclosure may provide one or more technical advantages. For example, in certain embodiments, overhead may be reduced for the transmission of the PNT-RS signal for the use-case with a multi-antenna receiver in uplink or downlink. Consider, for example, an uplink (UL) or downlink (DL) Multi-User Multiple Input Multiple Output (MU-MIMO) with four or more receiver antennas. If four users are multiplexed, four sub-carriers may be used. For example, each user may transmit on one sub-carrier and blank the other three sub-carriers. Alternatively, according to the methods described herein, only one sub-carrier may be used and the PNT-RS may be separated using the DMRS channel estimate. Accordingly, a technical advantage of certain embodiments may include an overhead reduction of up to seventy-five percent. Even where some interference remains and gain is lowered, an overhead reduction may be expected.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

According to certain embodiments, how the PNT-RS is beam-formed in relation to the DMRS may be implicitly or explicitly signaled. For example, the phase noise tracking reference signal (PNT-RS) may be mapped to at least one specific port on the DMRS. For example, in a particular embodiment, the phase noise tracking reference signal may be mapped to the first DMRS port. As such, the receiver may know that the channel estimate of the effective channel for said DMRS port represents the effective channel used to transmit the PNT-RSs. This enables a receiver and corresponding transmitter to optimize the beam-forming of said port to enable a good reception by the receiver. In certain embodiments, the receiver may exploit this optimized beam-forming as the DMRS for different users/layers are orthogonal and have higher processing gain than the PNT-RS, which is transmitted with low density to avoid too large over-head and potentially, in some embodiments, independent estimates are needed in each OFDM symbol.

As a result, PNT-RS reception may be spatially separated from data/other-signals (including other PNT-RS). Additionally, receiver gain may be improved due to the processing gain on DMRS. Thus, certain embodiments enable better reception for a multi-antenna receiver and can be exploited in different embodiments to enable multiplexing PNT-RS with data transmitted over the remaining antenna ports and/or other users. Some embodiments may also enable higher PNT-RS reuse.

Figure 1:
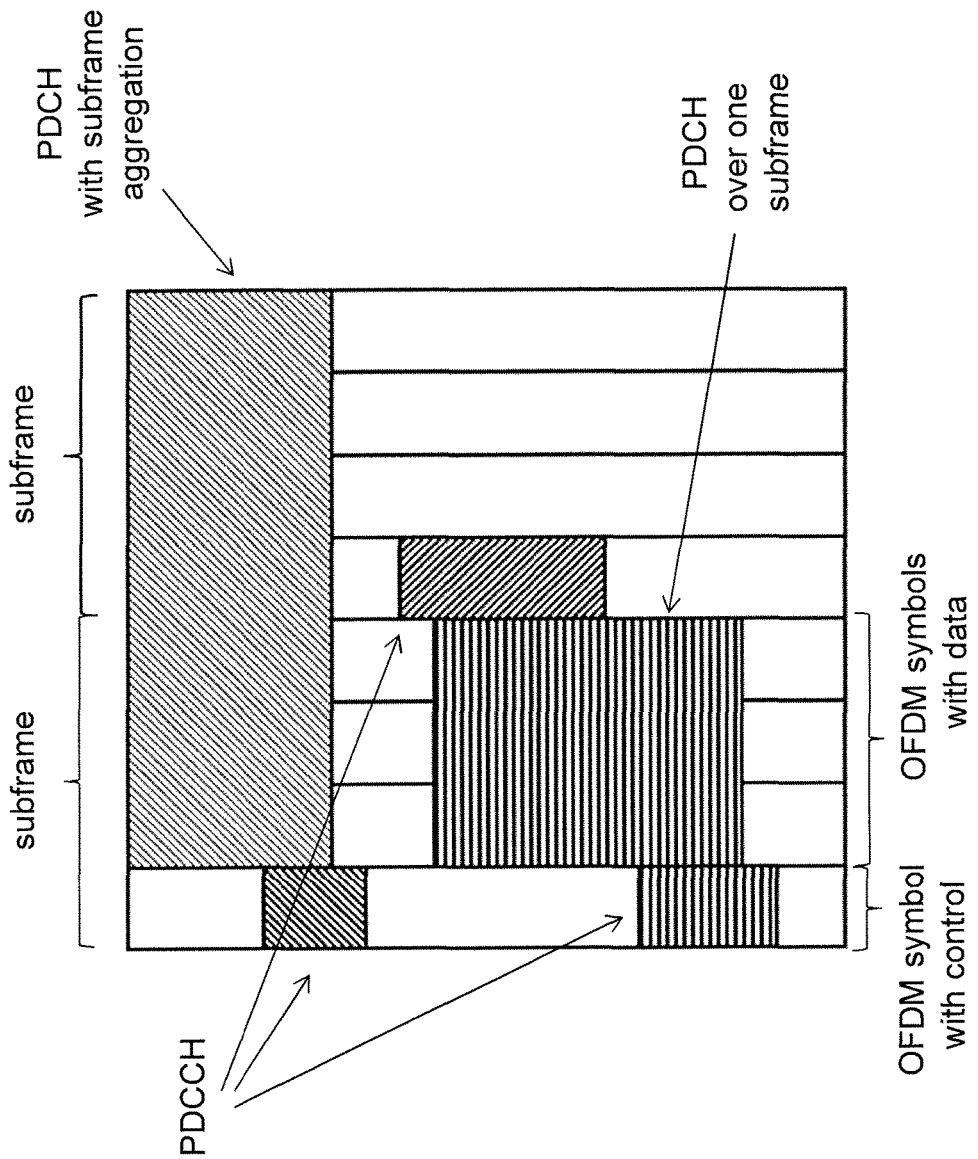
FIG. 1 is block diagram illustrating downlink transmissions of Physical Data Channel (PDCH) and associated Physical Downlink Control Channel (PDCCH) for carrying an assignment or grant.
Figure 2:
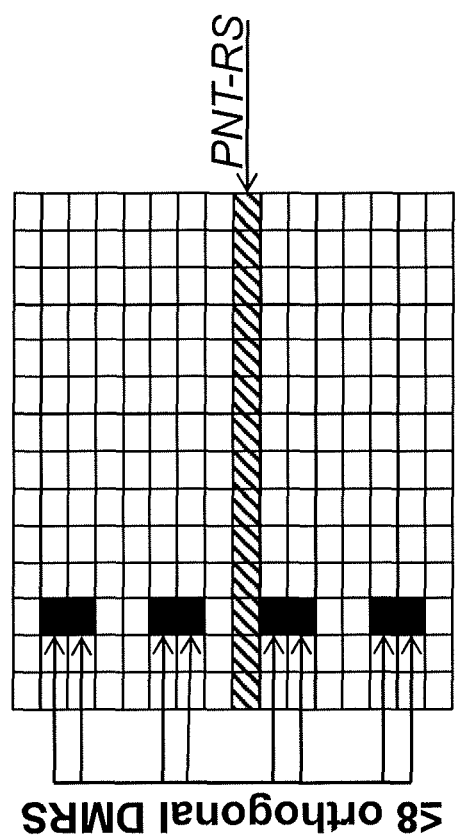
FIG. 2 is a block diagram illustrating an example time-frequency grid containing DMRS and phase noise tracking reference signals (PNT-RS)
Figure 3:
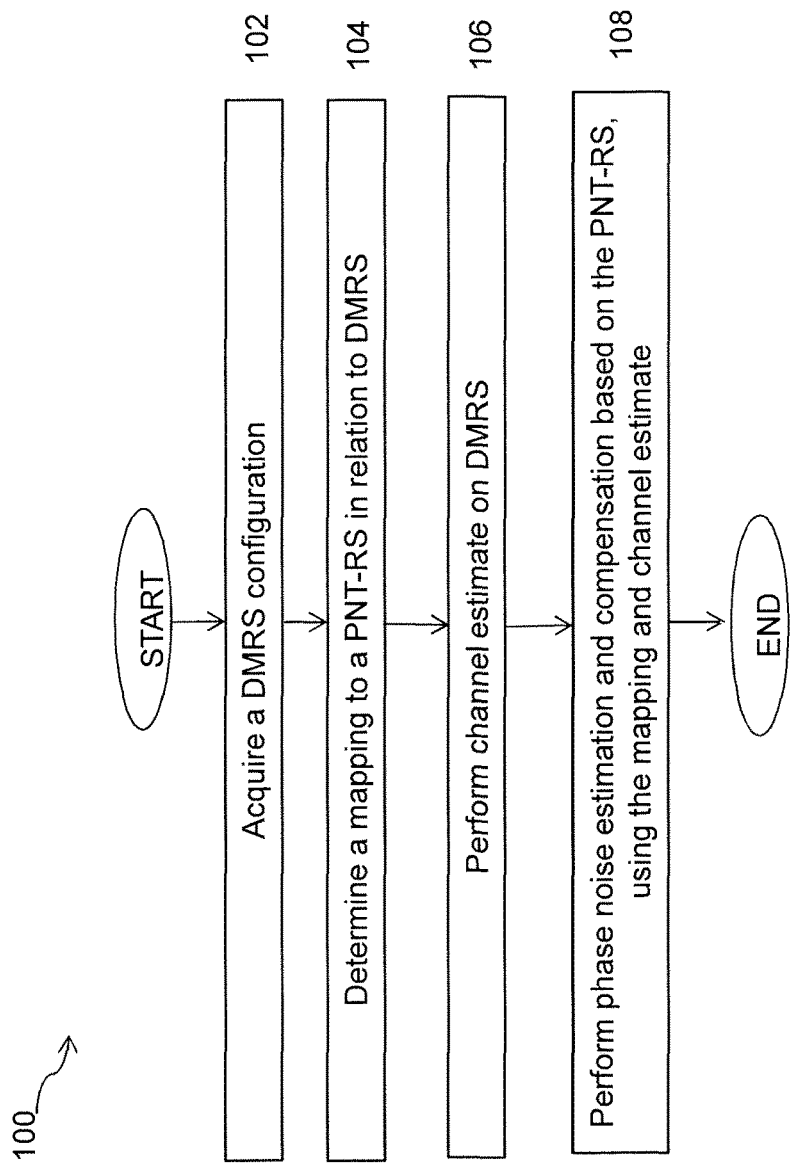
FIG. 3 is a flow diagram of an example method for PNT-RS reception by a receiver, in accordance with certain embodiments.

FIG. 3 is a flow diagram of an example method 100 for PNT-RS reception by a receiver, in accordance with certain embodiments. In various embodiments, the receiver may include a wireless device or a network node, of which exemplary embodiments are described in more detail below with respect to FIGS. 10-12.

In certain embodiments, the method begins at step 102 when a DMRS configuration is acquired. A mapping to a PNT-RS transmission in relation to the DMRS configuration is identified at step 104. In a particular embodiment, the PNT-RS may be mapped to a specific DMRS port. Specifically, and as just one example, the PNT-RS may be mapped to a first DMRS port.

At step 106, a channel estimate is performed on the DMRS. In certain embodiments, the channel estimate and the mapping may be used to determine a PNT-RS receiver setting. In particular embodiments, determining the PNT-RS receiver setting may include calculating PNT-RS receiver weights from the channel estimate.

At step 108, phase noise estimation and compensation is performed based on the PNT-RS and using the mapping and the channel estimate. In certain embodiments, the phase noise estimation and compensation may be performed on a received transmission of data symbols. In a particular embodiment, a PNT-RS may be interfered by other data associated with other layers associated with the receiver. The method may include estimating interference from the other layers based on the known channel from DMRS for the other layer and interference cancellation may be performed. Additionally or alternatively, the PNT-RS may be interfered by a co-scheduled PNT-RS associated with another receiver. The method may include acquiring the co-scheduled PNT-RS and a DMRS for the co-scheduled PNT-RS and performing interference cancellation for the co-scheduled PNT-RS.

Figure 4:
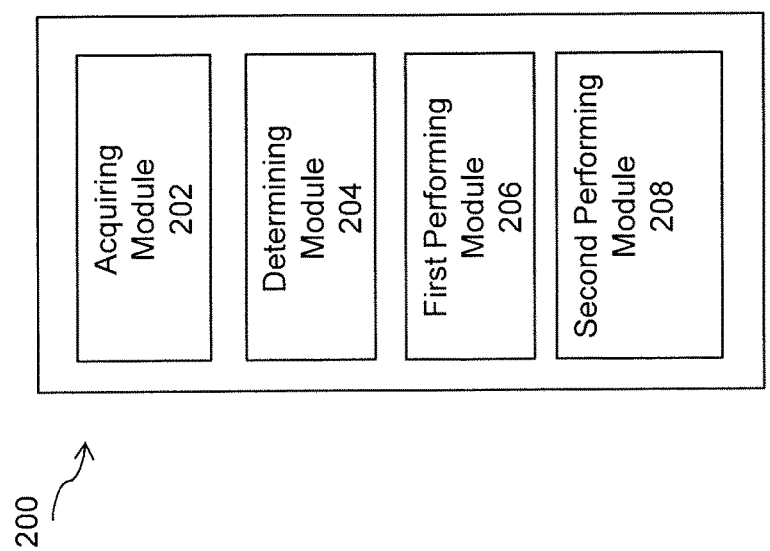
FIG. 4 is a block diagram illustrating an example virtual computing device for PNT-RS reception, in accordance with certain embodiments.

In certain embodiments, the method for PNT-RS reception as described above may be performed by a virtual computing device. FIG. 4 is a block diagram illustrating an example virtual computing device 200 for PNT-RS reception, in accordance with certain embodiments. As depicted, virtual computing device 200 may include modules for performing steps similar to those described above with regard to the method illustrated and described in FIG. 3. For example, virtual computing device 200 may include at least one acquiring module 202, a determining module 204, a first performing module 206, a second performing module 208, and any other suitable modules for PNT-RS reception. In some embodiments, one or more of the modules may be implemented by a processor, such as the exemplary processors described below with respect to FIGS. 11 and 12. Additionally, it is recognized that, in certain embodiments, the functions of two or more of the various modules described herein may be combined into a single module.

The acquiring module 202 may perform the acquiring functions of virtual computing device 200. For example, in certain embodiments, acquiring module 202 may acquire a DMRS configuration. In a particular embodiment, acquiring module 202 may receive the DMRS configuration from a network node. In another embodiment, acquiring module 202 may acquire the DMRS configuration from a wireless device.

The determining module 204 may perform the determining functions of virtual computing device 200. For example, in certain embodiments, determining module 204 may determine a mapping to a PNT-RS transmission in relation to the DMRS configuration. In a particular embodiment, for example, determining module 204 may determine that the PNT-RS is mapped to a specific DMRS port, such as a first DMRS port.

The first performing module 206 may perform one or more of the performing functions of virtual computing device 200. For example, in certain embodiments, performing module 206 may perform a channel estimate on the DMRS.

The second performing module 208 may perform one or more of the performing functions of virtual computing device 200. For example, in certain embodiments, second performing module 208 may perform phase noise estimation and compensation based on the PNT-RS determine a PNT-RS receiver setting. In a particular embodiment, second performing module 208 may perform the phase noise estimation and compensation using the mapping and the channel estimate.

Other embodiments of virtual computing device 200 may include additional components beyond those shown in FIG. 4 that may be responsible for providing certain aspects of the receiver's functionality, including any of the functionality described above and/or any additional functionality (including any functionality necessary to support the solutions described above). The receiver may include components having the same physical hardware but configured (e.g., via programming) to support different radio access technologies, or may represent partly or entirely different physical components than those depicted.

Figure 5:
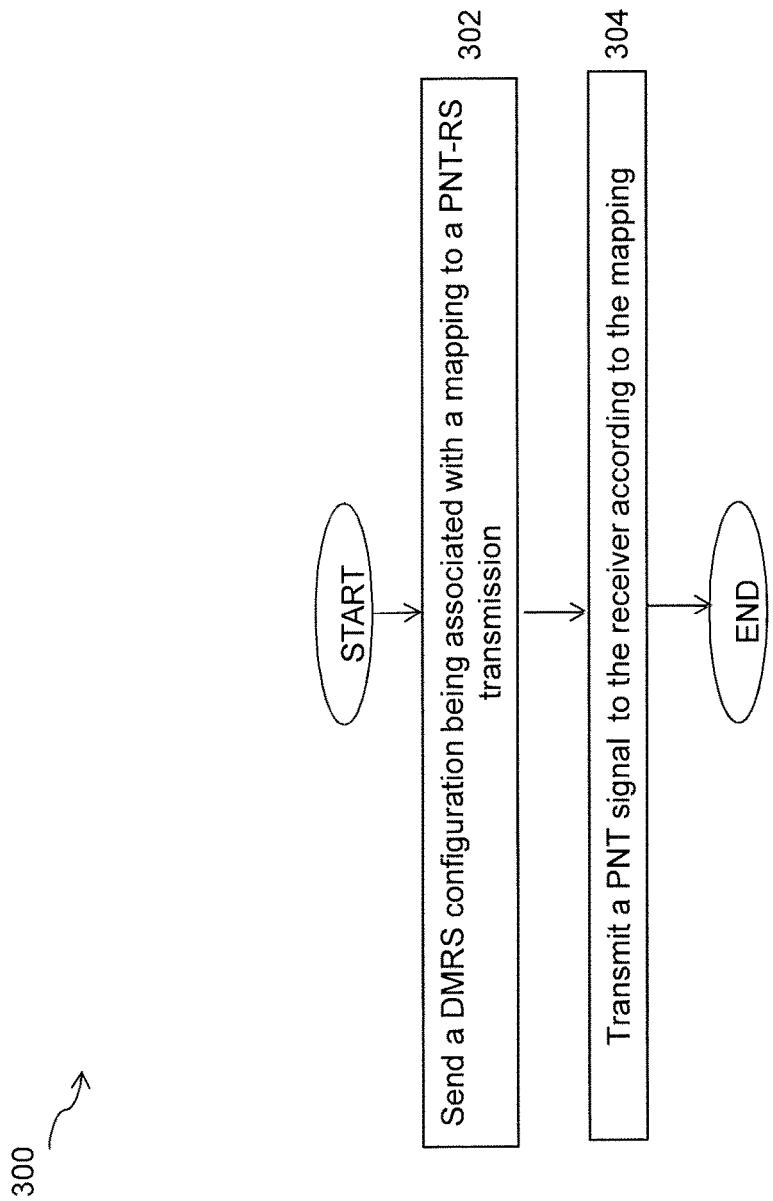
FIG. 5 is a flow diagram illustrating an example method for PNT-RS transmission by a transmitter, in accordance with certain embodiments.

FIG. 5 is a flow diagram illustrating an example method 300 for PNT-RS transmission by a transmitter, in accordance with certain embodiments. In various embodiments, the transmitter may include a wireless device or a network node, of which exemplary embodiments are described in more detail below with respect to FIGS. 10-12.

In certain embodiments, the method begins at step 302 when the transmitter sends a DMRS configuration. In a particular embodiment, the transmitter may be network node, which sends a DMRS configuration to a wireless device. In another embodiment, the transmitter may be a wireless device that sends a DMRS configuration to a network node.

In certain embodiments, the DMRS configuration may be associated with a mapping to a PNT-RS transmission. In a particular embodiment, for example, the PNT-RS may be mapped to a specific DMRS port such as, for example, the first DMRS port.

At step 304, the transmitter transmits a PNT-RS to the receiver according to the mapping. As described above, the receiver may use the mapping to determine a PNT-RS receiver setting which may in turn be used to perform phase noise estimation and compensation, in certain embodiments.

Figure 6:
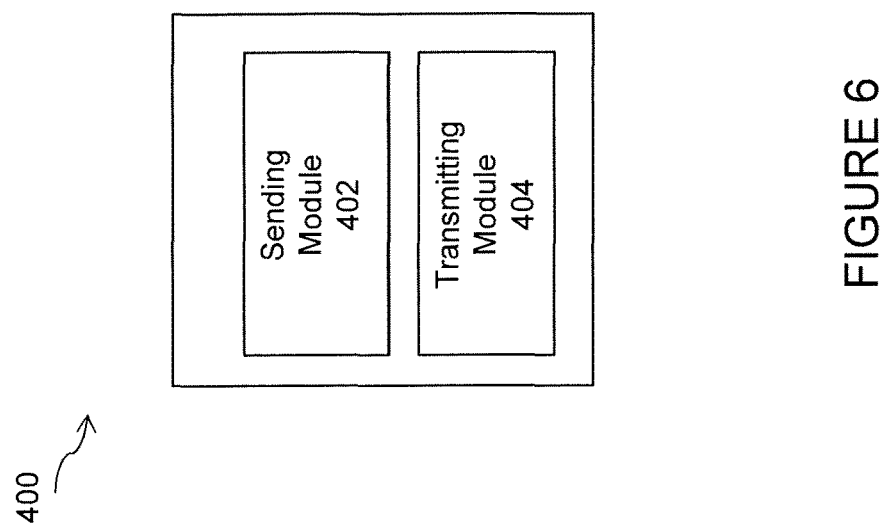
FIG. 6 is a block diagram illustrating an example virtual computing device for PNT-RS transmission, in accordance with certain embodiments.

In certain embodiments, the method for PNT-RS transmission as described above may be performed by a virtual computing device. FIG. 6 is a block diagram illustrating an example virtual computing device 400 for PNT-RS transmission, in accordance with certain embodiments. As depicted, virtual computing device 400 may include modules for performing steps similar to those described above with regard to the method illustrated and described in FIG. 5. For example, virtual computing device 400 may include at least a sending module 402, a transmitting module 404, and any other suitable modules for PNT-RS transmission. In some embodiments, one or more of the modules may be implemented by a processor, such as the exemplary processors described below with respect to FIGS. 11 and 12. Additionally, it is recognized that, in certain embodiments, the functions of two or more of the various modules described herein may be combined into a single module.

The sending module 402 may perform the sending functions of virtual computing device 400. For example, in certain embodiments, sending module 402 may send a DMRS configuration. In a particular embodiment, sending module 402 may send the DMRS configuration to a network node. In another embodiment, sending module 402 may send the DMRS configuration to a wireless device. The DMRS configuration may be associated with a mapping to a PNT-RS transmission from the DMRS configuration. In a particular embodiment, for example, the PNT-RS may be mapped to a specific DMRS port, such as a first DMRS port.

The transmitting module 404 may perform the transmitting functions of virtual computing device 400. For example, in certain embodiments, transmitting module 404 may transmit a PNT-RS to the receiver according to the mapping. As described above, the receiver may then use the mapping to determine a PNT-RS receiver setting which may in turn be used to perform phase noise estimation and compensation, in certain embodiments.

Other embodiments of virtual computing device 400 may include additional components beyond those shown in FIG. 6 that may be responsible for providing certain aspects of the receiver's functionality, including any of the functionality described above and/or any additional functionality (including any functionality necessary to support the solutions described above). The receiver may include components having the same physical hardware but configured (e.g., via programming) to support different radio access technologies, or may represent partly or entirely different physical components than those depicted.

Figure 7:
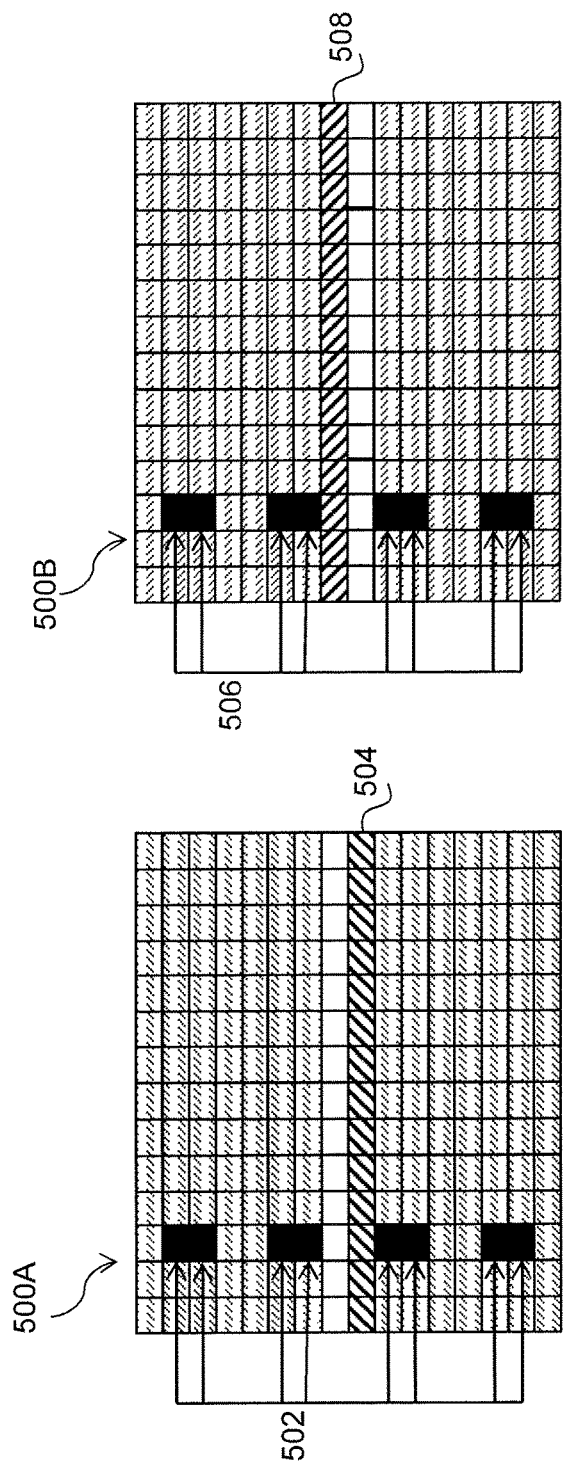
FIG. 7 is a block diagram illustrating an example time-frequency grid including blanked resource for PNT-RS, in accordance with certain embodiments.

FIG. 7 illustrates an example time-frequency grids 500A-B including blanked resource for phase noise tracking RS, in accordance with certain embodiments. More specifically, FIG. 7 illustrates a pair of time-frequency grids 500A and 500B for two respective receivers. As depicted, time-frequency grid 500A includes less than eight orthogonal DMRS 502 and PNT-RS 504. Likewise, time-frequency grid 500B includes less than eight orthogonal DMRS 506, which correspond with DMRS 502 of time-frequency grid 500A, and PNT-RS 508. However, the resources associated with each of PNT-RS 508 and PNT-RS 504 are blanked so that they are only used for the respective PNT-RS. Thus, in the depicted scenario, the PNT-RS is not multiplexed with any other signals. Accordingly, the main purpose of the channel estimate on DMRS is to increase the receiver gain when receiving PNT-RS. As such, a maximum radio transmission (MRT) receiver may be preferred, in certain embodiments.

Figure 8:
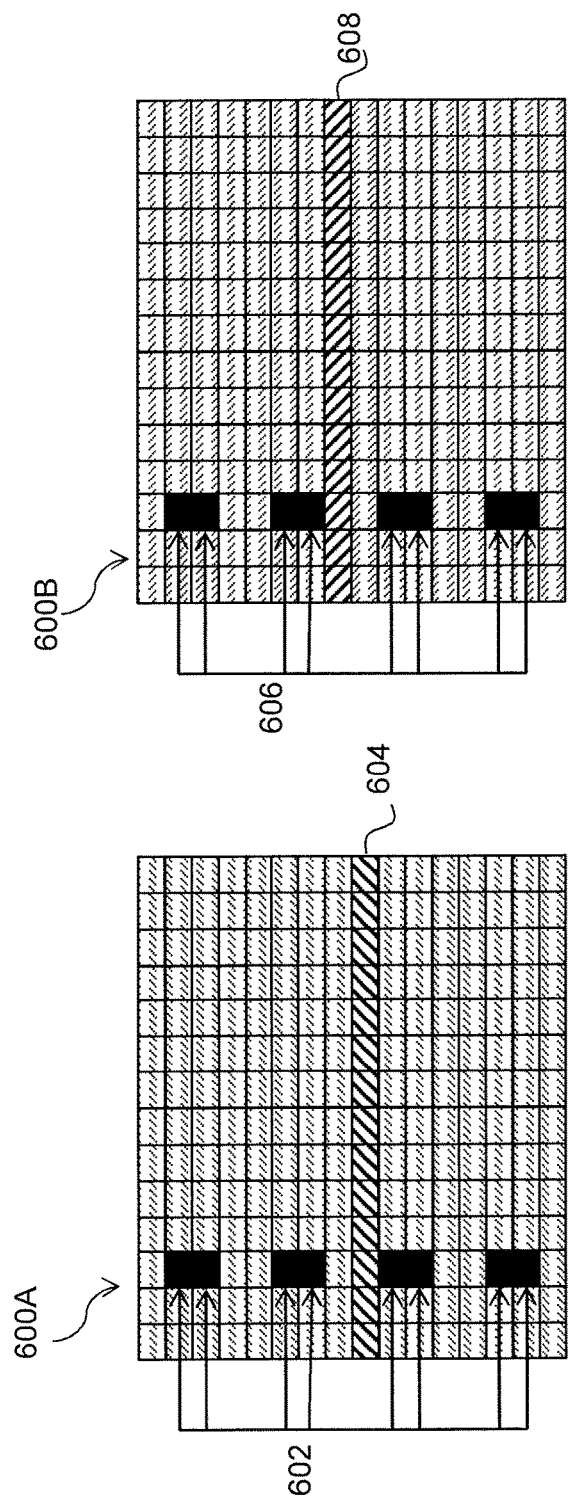
FIG. 8 is a block diagram illustrating another example time-frequency grid demonstrating PNT-RS interfered by data, in accordance with certain embodiments.

FIG. 8 illustrates an example time-frequency grids 600A-B including phase noise tracking RS interfered by data, in accordance with certain embodiments. More specifically, FIG. 8 illustrates a pair of time-frequency grids 600A and 600B for two respective receivers. Again, time-frequency grid 600A includes less than eight orthogonal DMRS 502 and PNT-RS 604. Time-frequency grid 600B includes less than eight orthogonal DMRS 606, which correspond with DMRS 602 of time-frequency grid 600A, and a PNT-RS 608. In contrast to FIG. 7, the resources used for PNT-RS 604 and 608 are not blanked and as a result are interfered by an interfering data.

In certain embodiments, the interfering signal refers to data from other layers from a Single User Multiple Input Multiple Output (SU-MIMO) or from Multiple User Multiple Input Multiple Output (MU-MIMO). In this situation, the receiver may treat interference from the other users as one unknown component and the interference from other layers as a second component that can be estimated due to the known channel (from DMRS) for these layers. It may be possible to treat interference from other layers in the same was as other interference. In particular, network assisted interference cancelation may be possible if the network signals the co-scheduled users either to the wireless device or over the backhaul to the receiving network nodes.

Figure 9:
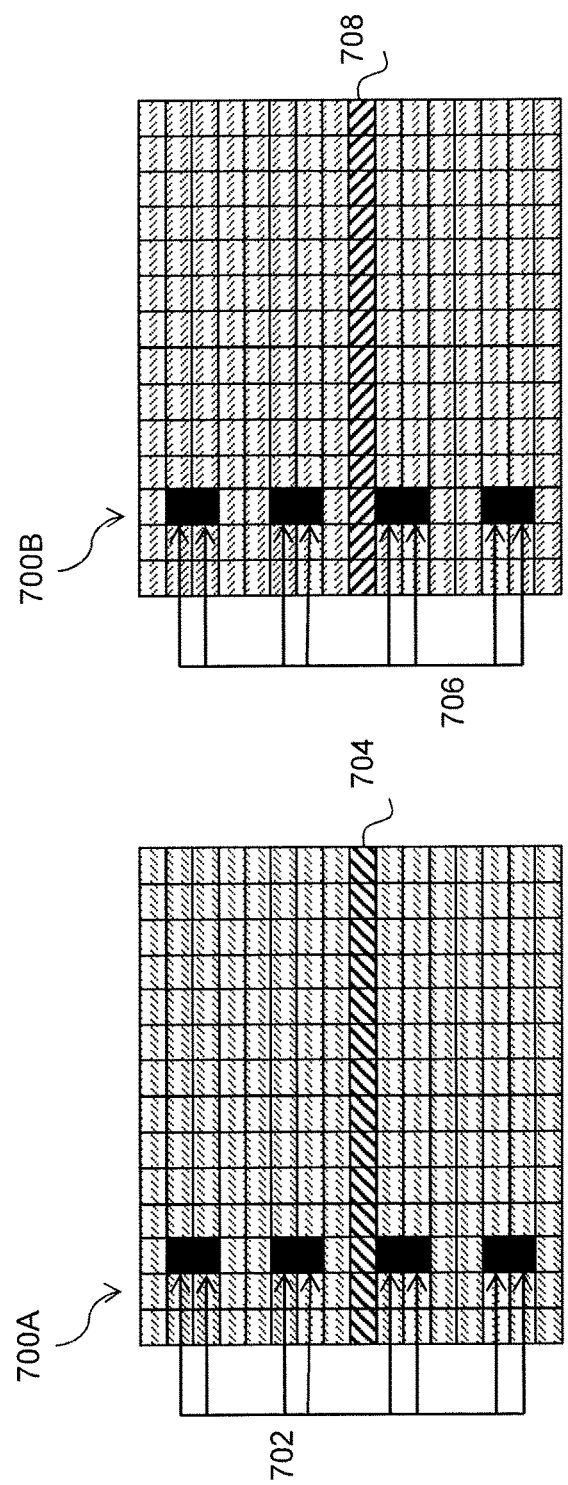
FIG. 9 is a block diagram illustrating another example time-frequency grid demonstrating PNT-RS interfered by other users PNT-RS, in accordance with certain embodiments.

FIG. 9 illustrates an example time-frequency grids 700A-B including PNT-RS interfered by other users PNT-RS, in accordance with certain embodiments. More specifically, FIG. 9 illustrates a pair of time-frequency grids 700A and 700B for two respective receivers. Again, time-frequency grid 700A includes less than eight orthogonal DMRS 702 and PNT-RS 704. Time-frequency grid 700B includes less than eight orthogonal DMRS 706, which correspond with DMRS 702 of time-frequency grid 700A, and a PNT-RS 708.

As depicted PNT-RS 708 and PNT-RS 704 are interfered by an interfering signal. In some embodiments, the interfering signal refers to the PNT-RS from other users. For example, PNT-RS 708 is interfered by PNT-RS 704, and vice versa.

In certain embodiments, the receiver has less interference from the other users as it is assumed that each user only needs one PNT-RS independent upon the number of layers in the transmission. For example, in some embodiments, there may be less interference on the PNT-RS. Accordingly, in certain embodiment, network-assisted interference cancelation may be very beneficial since the network can signal not only the co-scheduled phase noise tracking RS (if any) but also the relevant DMRS for the co-scheduled synchronization signals. As a result, very efficient cancelation of the other PNT-RS.

Figure 10:
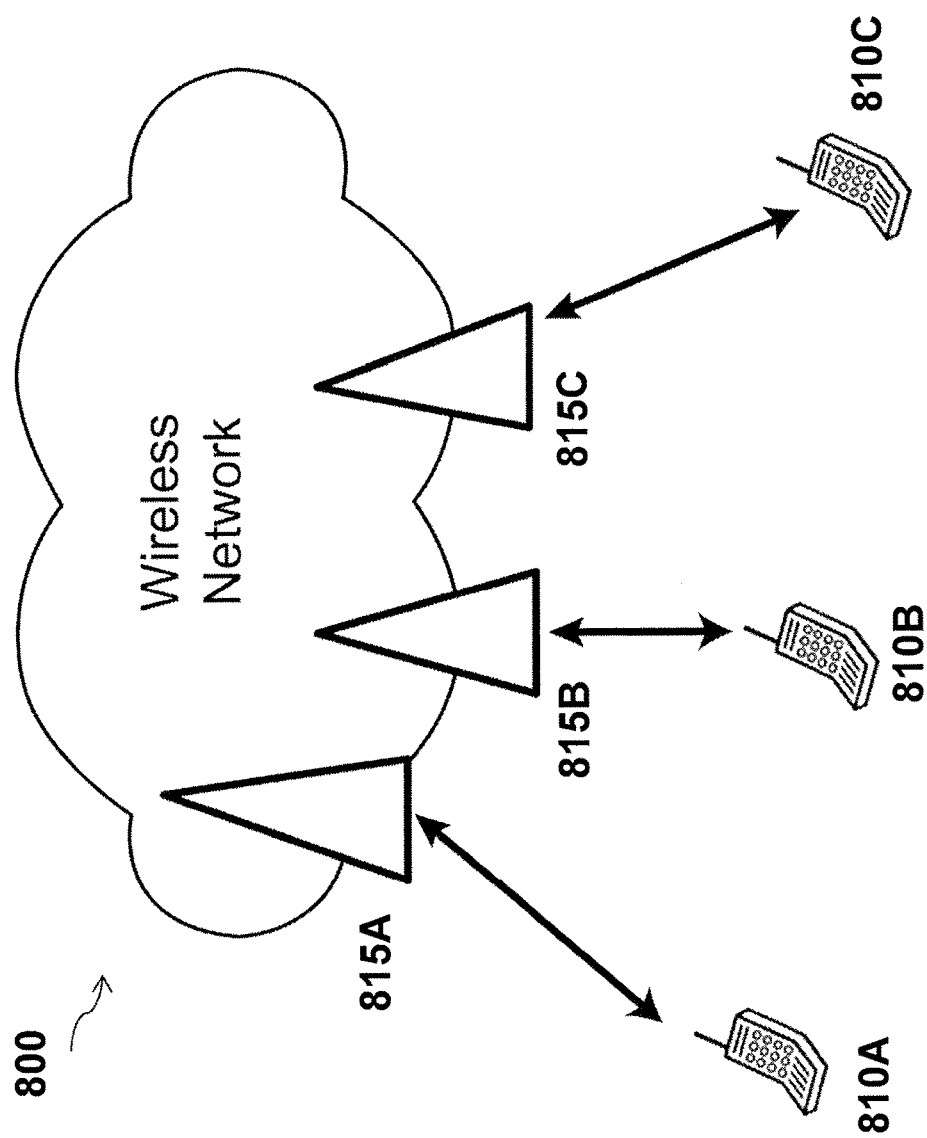
FIG. 10 is a block diagram illustrating an example embodiment of a network for PNT-RS reception, in accordance with certain embodiments.

FIG. 10 is a block diagram illustrating an embodiment of a network 800, in accordance with certain embodiments. Network 800 includes one or more wireless devices 810A-C, which may be interchangeably referred to as wireless devices 810 or UEs 810, and network nodes 815A-C, which may be interchangeably referred to as network nodes 815 or eNodeBs (eNBs) 815. A wireless device 810 may communicate with network nodes 815 over a wireless interface. For example, a wireless device 810A may transmit wireless signals to one or more of network nodes 815, and/or receive wireless signals from one or more of network nodes 815. The wireless signals may contain voice traffic, data traffic, control signals, and/or any other suitable information. In some embodiments, an area of wireless signal coverage associated with a network node 815 may be referred to as a cell. In some embodiments, wireless devices 810 may have D2D capability. Thus, wireless devices 810 may be able to receive signals from and/or transmit signals directly to another wireless device. For example, wireless device 810A may be able to receive signals from and/or transmit signals to wireless device 810B.

In certain embodiments, network nodes 815 may interface with a radio network controller (not depicted in FIG. 10). The radio network controller may control network nodes 815 and may provide certain radio resource management functions, mobility management functions, and/or other suitable functions. In certain embodiments, the functions of the radio network controller may be included in network node 815. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 810. Wireless devices 810 may exchange certain signals with the core network node using the non-access stratum layer. In non-access stratum signaling, signals between wireless devices 810 and the core network node may be transparently passed through the radio access network. In certain embodiments, network nodes 815 may interface with one or more network nodes over an internode interface. For example, network nodes 815A and 815B may interface over an X2 interface (not depicted).

As described above, example embodiments of network 800 may include one or more wireless devices 810, and one or more different types of network nodes capable of communicating (directly or indirectly) with wireless devices 810. Wireless device 110 may refer to any type of wireless device capable of communicating with network nodes 815 or another wireless device 810 over radio signals. Wireless device 810 may also be a radio communication device, target device, device-to-device (D2D) UE, machine-type-communication UE or UE capable of machine to machine communication (M2M), a sensor equipped with UE, iPad, Tablet, mobile terminals, smart phone, laptop embedded equipped (LEE), laptop mounted equipment (LME), USB dongles, Customer Premises Equipment (CPE), etc. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Also, in some embodiments generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT, or any suitable network node.

The terminology such as network node and UE should be considering non-limiting and does in particular not imply a certain hierarchical relation between the two; in general "eNodeB" could be considered as device 1 and "UE" device 2, and these two devices communicate with each other over some radio channel. Example embodiments of wireless devices 810, network nodes 815, and other network nodes (such as radio network controller or core network node) are described in more detail with respect to FIGS. 11, 12, and 13, respectively.

Although FIG. 10 illustrates a particular arrangement of network 800, the present disclosure contemplates that the various embodiments described herein may be applied to a variety of networks having any suitable configuration. For example, network 800 may include any suitable number of wireless devices 810 and network nodes 815, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

Figure 11:
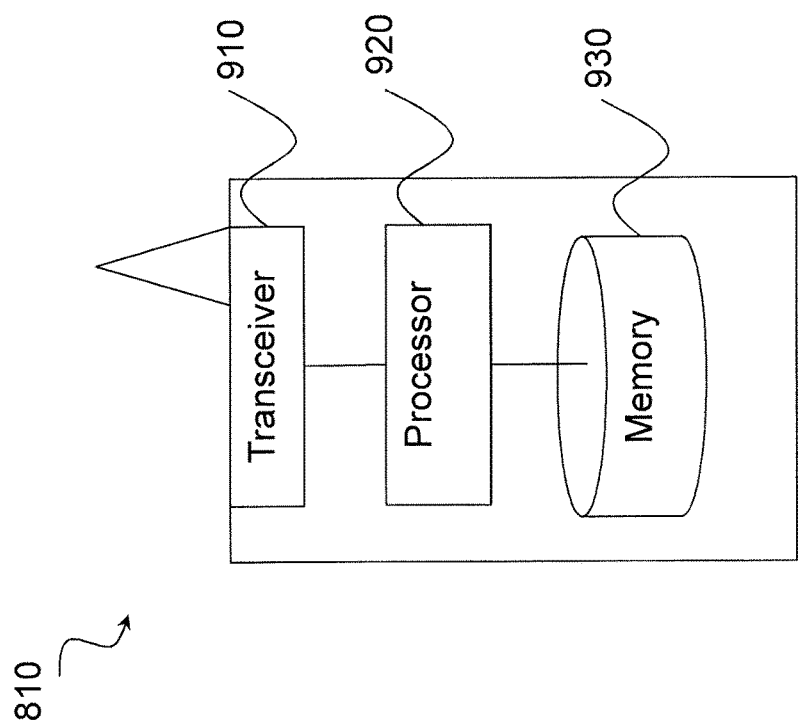
FIG. 11 is a block schematic of an exemplary wireless device for transmission or reception of PNT-RS, in accordance with certain embodiments.

FIG. 11 is a block schematic of an exemplary wireless device 810, in accordance with certain embodiments. As depicted, wireless device 810 includes transceiver 910, processor 920, and memory 930. In some embodiments, transceiver 910 facilitates transmitting wireless signals to and receiving wireless signals from network node 815 (e.g., via an antenna), processor 920 executes instructions to provide some or all of the functionality described above as being provided by wireless device 810, and memory 930 stores the instructions executed by processor 920.

Processor 920 may include any suitable combination of hardware and software implemented in one or more modules to execute instructions and manipulate data to perform some or all of the described functions of wireless device 810. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 810 may include additional components beyond those shown in FIG. 11 that may be responsible for providing certain aspects of the wireless device's functionality, including any of the functionality described above and/or any additional functionality (including any functionality necessary to support the solution described above). In certain embodiments, for example, wireless device 810 may include components for performing the reception method discussed above with regard to FIG. 3 and/or the transmission method discussed above with regard to FIG. 5.

Figure 12:
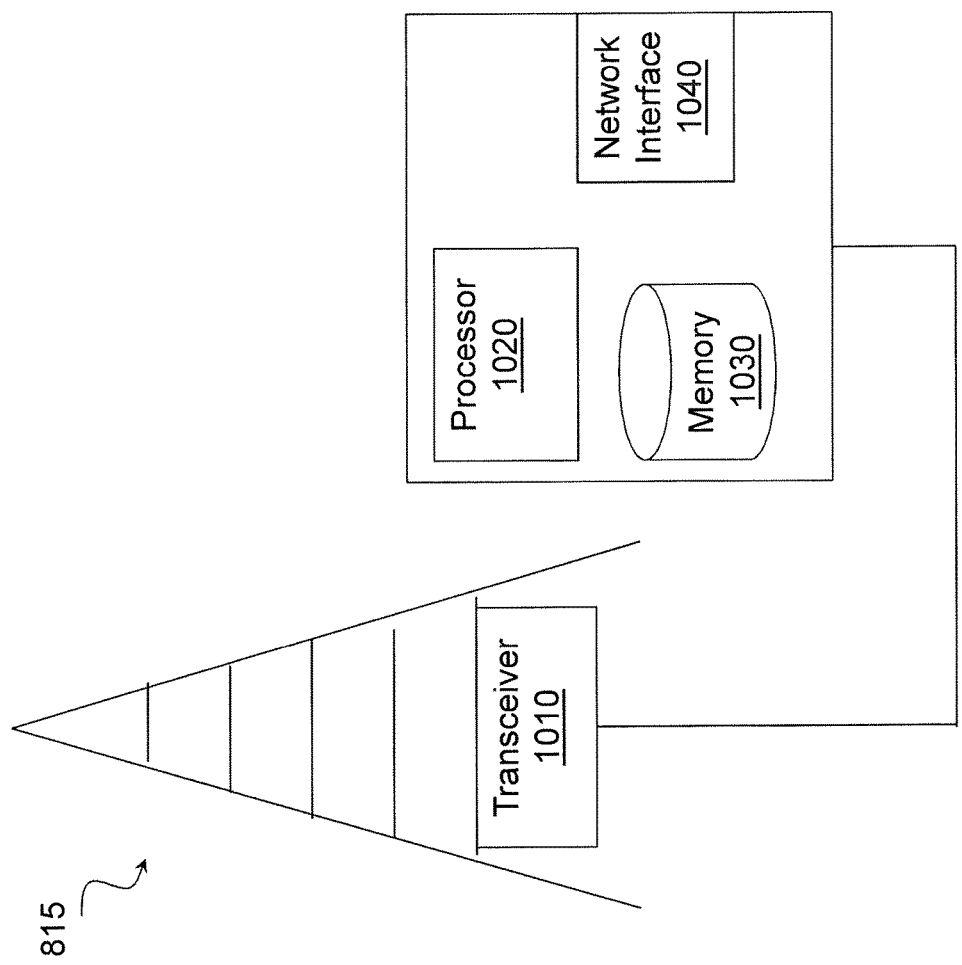
FIG. 12 is a block schematic of an exemplary network node for transmission or reception of PNT-RS, in accordance with certain embodiments.

FIG. 12 is a block schematic of an exemplary network node 815, in accordance with certain embodiments. Network node 815 may be any type of radio network node or any network node that communicates with a wireless device 810 and/or with another network node 815. Network nodes 815 may be deployed throughout network 800 as a homogenous deployment, heterogeneous deployment, or mixed deployment. A homogenous deployment may generally describe a deployment made up of the same (or similar) type of network nodes 815 and/or similar coverage and cell sizes and inter-site distances. A heterogeneous deployment may generally describe deployments using a variety of types of network nodes 815 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

As depicted, network node 815 may include one or more of transceiver 1010, processor 1020, memory 1030, and network interface 1040. In some embodiments, transceiver 1010 facilitates transmitting wireless signals to and receiving wireless signals from wireless device 810 (e.g., via an antenna), processor 1020 executes instructions to provide some or all of the functionality described above as being provided by a network node 815, memory 1030 stores the instructions executed by processor 1020, and network interface 1040 communicates signals to backend network components, such as a gateway, switch, router, Internet, Public Switched Telephone Network (PSTN), core network nodes or radio network controllers, etc.

In certain embodiments, network node 815 may be capable of using multi-antenna techniques, and may be equipped with multiple antennas and capable of supporting Multiple Input Multiple Output (MIMO) techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processor 1020 may include any suitable combination of hardware and software implemented in one or more modules to execute instructions and manipulate data to perform some or all of the described functions of network node 815. In some embodiments, processor 1020 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for network node 815, send output from network node 815, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of network node 815 may include additional components beyond those shown in FIG. 12 that may be responsible for providing certain aspects of the radio network node's functionality, including any of the functionality described above and/or any additional functionality (including any functionality necessary to support the solutions described above). In certain embodiments, for example, network node 815 may include components for performing the reception method discussed above with regard to FIG. 3 and/or the transmission method discussed above with regard to FIG. 5. The various different types of network nodes may include components having the same physical hardware but configured (e.g., via programming) to support different radio access technologies, or may represent partly or entirely different physical components.

Figure 13:
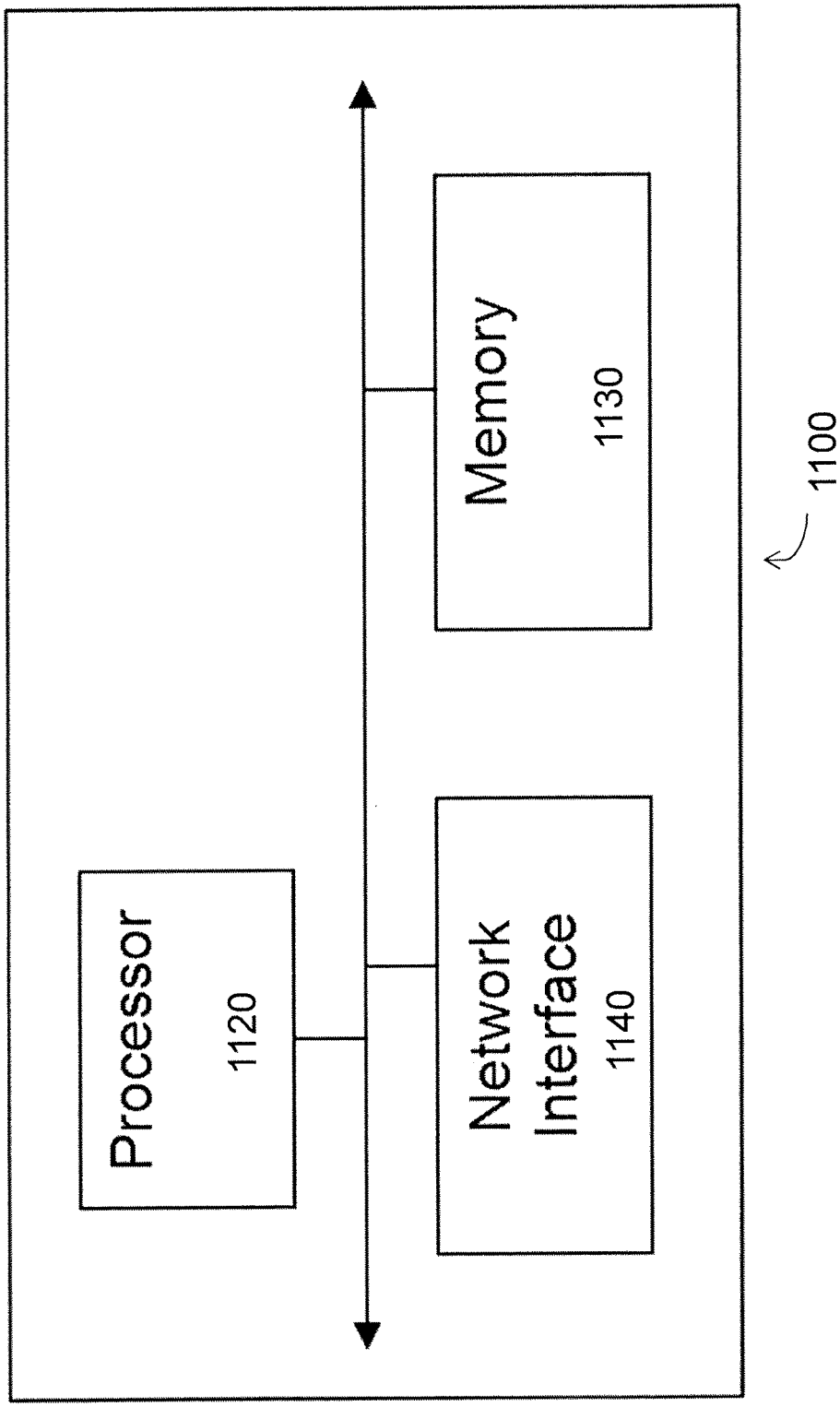
FIG. 13 is a block schematic of an exemplary radio network controller or core network node, in accordance with certain embodiments.

FIG. 13 is a block schematic of an exemplary radio network controller or core network node 1100, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 1100 include processor 1120, memory 1130, and network interface 1140. In some embodiments, processor 1120 executes instructions to provide some or all of the functionality described above as being provided by the network node, memory 1130 stores the instructions executed by processor 1120, and network interface 1140 communicates signals to any suitable node, such as a gateway, switch, router, Internet, Public Switched Telephone Network (PSTN), network nodes 115, radio network controllers or core network nodes, etc.

Processor 1120 may include any suitable combination of hardware and software implemented in one or more modules to execute instructions and manipulate data to perform some or all of the described functions of the radio network controller or core network node. In some embodiments, processor 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processor 1120 and may refer to any suitable device operable to receive input for the network node, send output from the network node, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

Other embodiments of the network node may include additional components beyond those shown in FIG. 13 that may be responsible for providing certain aspects of the network node's functionality, including any of the functionality described above and/or any additional functionality (including any functionality necessary to support the solution described above).

According to certain embodiments, a user equipment is provided for use in a cellular network. The user equipment may include a transceiver, a processor, and a memory. The user equipment may be configured to acquire a Demodulation Reference Signal (DMRS) configuration. A mapping is determined from the DMRS configuration to a phase noise tracking reference signal (PNT-RS). A channel estimate is performed using the DMRS configuration. Phase noise estimation and compensation is performed based on the PNT-RS by using the mapping and the channel estimate.

According to certain embodiments, a method by a user equipment is provided for use in a cellular network. The method includes acquiring a Demodulation Reference Signal (DMRS) configuration. A mapping is determined from the DMRS configuration to a phase noise tracking reference signal (PNT-RS). A channel estimate is performed using the DMRS configuration. Phase noise estimation and compensation is performed based on the PNT-RS by using the mapping and the channel estimate.

According to certain embodiments, a user equipment is provided for use in a cellular network. The user equipment includes a transceiver, a processor, and a memory. The user equipment is configured to send a Demodulation Reference Signal (DMRS) configuration. The DMRS configuration is associated with a mapping to a PNT-RS transmission. A PNT-RS is transmitted to the receiver according to the mapping.

According to certain embodiments, a method by a user equipment is provided for use in a cellular network. The method includes sending a Demodulation Reference Signal (DMRS) configuration. The DMRS configuration is associated with a mapping to a PNT-RS transmission. A PNT-RS is transmitted to the receiver according to the mapping.

According to certain embodiments, a network node is provided for use in a cellular network. The network node includes a transceiver, a processor, and a memory. The network node is configured to acquire a Demodulation Reference Signal (DMRS) configuration. A mapping is determined from the DMRS configuration to a phase noise tracking reference signal (PNT-RS). A channel estimate is performed using the DMRS configuration. Phase noise estimation and compensation is performed based on the PNT-RS by using the mapping and the channel estimate.

According to certain embodiments, a method by a network node is provided for use in a cellular network. The method includes acquiring a Demodulation Reference Signal (DMRS) configuration. A mapping is determined from the DMRS configuration to a phase noise tracking reference signal (PNT-RS). A channel estimate is performed using the DMRS configuration. Phase noise estimation and compensation is performed based on the PNT-RS by using the mapping and the channel estimate.

According to certain embodiments, a network node is provided for use in a cellular network. The network node includes a transceiver, a processor, and a memory. The network node is configured to send a Demodulation Reference Signal (DMRS) configuration. The DMRS configuration is associated with a mapping to a PNT-RS transmission. A PNT-RS is transmitted to the receiver according to the mapping.

According to certain embodiments, a method by a network node is provided for use in a cellular network. The method includes sending a Demodulation Reference Signal (DMRS) configuration. The DMRS configuration is associated with a mapping to a PNT-RS transmission. A PNT-RS is transmitted to the receiver according to the mapping.

According to certain embodiments, a method by a receiver is provided for use in a cellular network. The method includes acquiring a Demodulation Reference Signal (DMRS) configuration. A mapping to a PNT-RS transmission from the DMRS configuration is determined. A channel estimate is performed using the DMRS configuration. Phase noise estimation and compensation is performed based on the PNT-RS by using the mapping and the channel estimate.

According to certain embodiments, a receiver is provided for use in a cellular network. The receiver includes a transceiver, a transmitter, a processor, and a memory. The receiver is configured to acquire a Demodulation Reference Signal (DMRS) configuration and determine a mapping to a PNT-RS transmission from the DMRS configuration. A channel estimate is performed using the DMRS configuration. Phase noise estimation and compensation is performed based on the PNT-RS, using the mapping and the channel estimate.

According to certain embodiments, a method by a transmitter is provided. The method includes sending, by the transmitter, a Demodulation Reference Signal (DMRS) configuration. The DMRS configuration being associated with a mapping to a PNT-RS transmission. A PNT-RS is transmitted to the receiver according to the mapping.

According to certain embodiments, a transmitter is provided for use in a cellular network. The transmitter includes a transceiver, a transmitter, a processor, and a memory. The transmitter is configured to send a Demodulation Reference Signal (DMRS) configuration, the DMRS configuration being associated with a mapping to a PNT-RS transmission. A PNT-RS is transmitted to the receiver according to the mapping.

Certain embodiments of the present disclosure may provide one or more technical advantages. For example, in certain embodiments, overhead may be reduced for the transmission of the PNT-RS signal for the use-case with a multi-antenna receiver in uplink or downlink. Consider, for example, an uplink (UL) or downlink (DL) Multi-User Multiple Input Multiple Output (MU-MIMO) with four or more receiver antennas. If four users are multiplexed, four sub-carriers may be used. For example, each user may transmit on one sub-carrier and blank the other three sub-carriers. Alternatively, according to the methods described herein, only one sub-carrier may be used and the PNT-RS may be separated using the DMRS channel estimate. Accordingly, a technical advantage of certain embodiments may include an overhead reduction of up to seventy-five percent. Even where some interference remains and gain is lowered, an overhead reduction may be expected.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A user equipment for use in a cellular network, the user equipment comprising a transceiver, a processor, and a memory, the user equipment configured to:
   acquire a Demodulation Reference Signal (DMRS) configuration;
   determine a mapping from the DMRS configuration to a phase noise tracking reference signal (PNT-RS);
   perform a channel estimate using the DMRS configuration; and
   perform phase noise estimation and compensation, based on the PNT-RS, using the mapping and the channel estimate.

2. The user equipment of claim 1, wherein determining the mapping comprises mapping the PNT-RS to a specific DMRS port.

3. The user equipment of claim 1, wherein the phase noise estimation and compensation is based on a PNT-RS receiver setting, which is based on the mapping and the channel estimate.

4. The user equipment of claim 1, wherein the DMRS configuration is acquired based on a DMRS transmitted by the cellular network.

5. The user equipment of claim 1, wherein the channel estimate is calculated using the DMRS configuration.

6. The user equipment of claim 1, wherein the DMRS occupies a greater number of subcarriers per subframe than the PNT-RS, and wherein the PNT-RS occupies a greater number of OFDM symbols per subframe than the DMRS.

7. The user equipment of claim 1, wherein the DMRS occupies a plurality of subcarriers that are separated by a plurality of other subcarriers, and wherein the PNT-RS occupies a plurality of successive OFDM symbols.

8. The user equipment of claim 7, wherein the DMRS occupies two or more sets of adjacent subcarriers, each set of adjacent subcarriers separated by a plurality of other subcarriers, and wherein the PNT-RS occupies a plurality of successive OFDM symbols not occupied by the DMRS.

9. A method by a user equipment for use in a cellular network, the method comprising:
   acquiring a Demodulation Reference Signal (DMRS) configuration;
   determining a mapping from the DMRS configuration to a phase noise tracking reference signal (PNT-RS);
   performing a channel estimate using the DMRS configuration; and
   performing phase noise estimation and compensation, based on the PNT-RS, using the mapping and the channel estimate.

10. The method of claim 9, wherein determining the mapping comprises mapping the PNT-RS to a specific DMRS port.

11. The method of claim 9, wherein the phase noise estimation and compensation is based on a PNT-RS receiver setting, which is based on the mapping and the channel estimate.

12. The method of claim 11, wherein the DMRS configuration is acquired based on a DMRS transmitted by the cellular network.

13. The method of claim 9, wherein the channel estimate is calculated using the DMRS configuration.

14. The method of claim 9, wherein the DMRS occupies a greater number of subcarriers per subframe than the PNT-RS, and wherein the PNT-RS occupies a greater number of OFDM symbols per subframe than the DMRS.

15. The method of claim 9, wherein the DMRS occupies a plurality of subcarriers that are separated by a plurality of other subcarriers, and wherein the PNT-RS occupies a plurality of successive OFDM symbols.

16. The method of claim 15, wherein the DMRS occupies two or more sets of adjacent subcarriers, each set of adjacent subcarriers separated by a plurality of other subcarriers, and wherein the PNT-RS occupies a plurality of successive OFDM symbols not occupied by the DMRS.

17. A network node for use in a cellular network, the network node comprising a transceiver, a processor, and a memory, the network node configured to:
 acquire a Demodulation Reference Signal (DMRS) configuration;
 determine a mapping from the DMRS configuration to a phase noise tracking reference signal (PNT-RS);
 perform a channel estimate using the DMRS configuration; and
 perform phase noise estimation and compensation, based on the PNT-RS, using the mapping and the channel estimate.

18. A method by a network node for use in a cellular network, the method comprising:
 acquiring a Demodulation Reference Signal (DMRS) configuration;
 determining a mapping from the DMRS configuration to a phase noise tracking reference signal (PNT-RS);
 performing a channel estimate using the DMRS configuration; and
 performing phase noise estimation and compensation, based on the PNT-RS, using the mapping and the channel estimate.

* * * * *